E. Ripley.

Tea Kettle.

No. 3,256. Reissued Jan. 5, 1869.

Witnesses.
R. J. Campbell
L. N. Campbell

Inventor.
Ezra Ripley
by
Mann, Hanick & Laurence

United States Patent Office.

EZRA RIPLEY, OF TROY, NEW YORK.

*Letters Patent No.* 31,035, *dated January* 1, 1861; *reissue No.* 2,122, *dated December* 5, 1865; *reissue No.* 3,256, *dated January* 5, 1869.

DIVISION No. 1.

IMPROVEMENT IN TEA-KETTLES.

The Schedule referred to in these Letters Patent and making part of the same.

*To all whom it may concern:*

Be it known that I, EZRA RIPLEY, of Troy, in the county of Rensselaer, and State of New York, have invented a new and improved Mode of Constructing Tea-Kettles; and I do hereby declare that the following is a full, clear, and exact description of my invention, embraced by Division No. 1, reference being had to the accompanying drawings, making a part of this specification, in which—

Similar letters of reference indicate corresponding parts.

Heretofore, tea-kettles have been provided with detachable covers, which would frequently fall off, and render it very inconvenient and unsafe to tilt the vessels, as in the act of pouring liquids from them, particularly so when the vessels contained hot, steaming liquids.

Another plan consisted in hinging the covers on the kettles, so that they could be swung upward, or lifted, when it was desired to expose the openings through which the kettles were filled.

This latter method, while it is preferable to the loose, detachable covers, is also liable to several objections, among which might be mentioned the liability of scalding the person in the act of pouring liquids from kettles having covers so hinged.

To remedy these objections, the nature of my invention consists in the application of covers to tea-kettles, in such manner that, while the covers shall not be allowed to become casually detached from their vessels, they are allowed to be moved from and over the openings in the tops of such vessels, in the plane of their flat faces, or, in other words, in a lateral or edgewise direction, in contradistinction to a flatwise or vertical movement, as will be hereinafter explained.

The following is a description of one practical mode of carrying out my invention.

In the accompanying drawings, I have represented the cover D applied, in my improved manner, to the mouth or opening of a tea-kettle, of which A′ is the spout, and F, the bail or handle.

Figure 1:
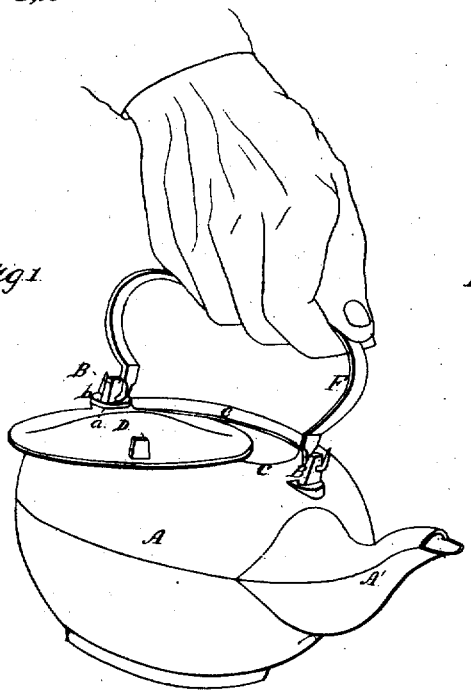
Figure 1 is a perspective view of my improved tea-kettle.
Figure 2:
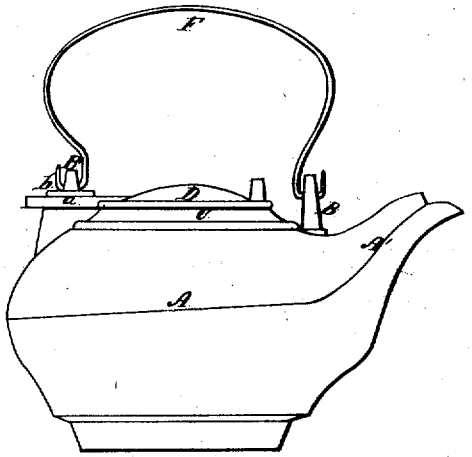
Figure 2 is a side elevation of the tea-kettle.
Figure 3:
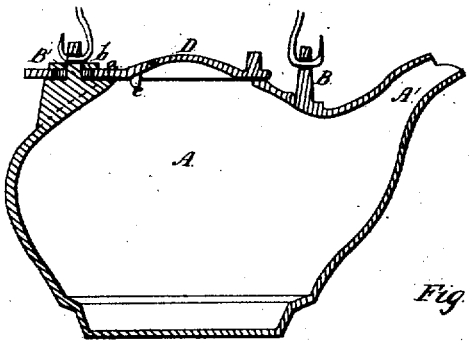
Figure 3 is a section taken in a vertical plane through the centre of the kettle.

This bail is attached to two lugs or ears, B B′, one of which may be cast solid, or otherwise applied to the top of the kettle, and the other lug or ear, B′, may be applied to or formed on the top of the kettle, substantially as shown in fig. 3.

The bail F may be hooked or attached to these two lugs in the usual well-known manner.

The rear lug, B′, serves as a pivot by which to hinge the cover D to the kettle, and the washer *b* and rear hooked attachment of the bail F may be made to hold the cover down in place upon the horizontal margin *c*, which surrounds the opening through which liquids are poured into the kettle.

To attach cover D to the lug B′, this cover is constructed with an extension or ear, *a*, upon its circumference, through which a hole is made for receiving the said lug, and allowing the cover to fit snugly down upon the margin *c*, as shown in fig. 3, so as to make a closely-fitting joint, when in its place over the filling-opening.

Figure 4:
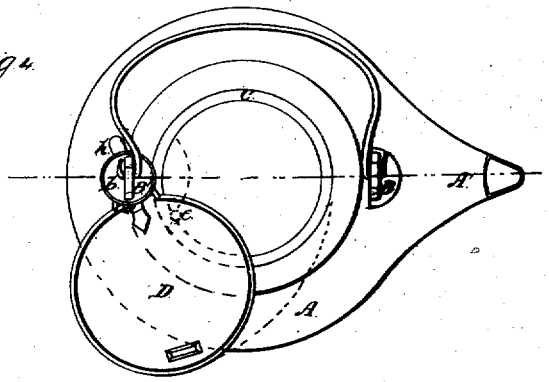
Figure 4 is a top view of the kettle, showing the cover swung around so as to fully expose the mouth of the kettle.

To prevent the cover D from turning entirely around the lug B′, a stud, *e*, may be applied to its bottom side, at a proper point, to serve as a stop by abutting against one side of the margin *c*, when the cover is in the position shown in fig. 4, and when the cover is moved over its opening, by abutting against the opposite side of the margin *c*, the stud *e* will stop this cover in said position.

Figure 5:
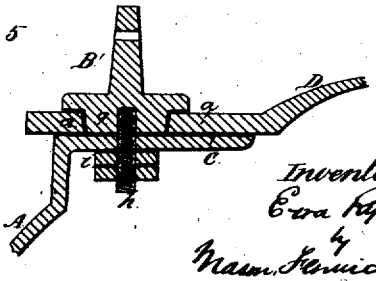
Figure 5 is a sectional view of a modification of the mode, shown in figs. 1, 2, 3, and 4, of pivoting the cover.

The drawing, fig. 5, shows in section another mode of applying the rear lug B′ to the kettle, and consists in constructing said lug with a pivotal portion, *g*, upon it, and also a screw-threaded stem, *h*, which latter is passed through a hole made through the kettle, just outside of its margin *c*, and provided with a nut, by which the lug is confined rigidly in its place.

In this modification the shoulder, just above the pivotal portion *g*, together with the nut *i* on screw-stem *h*, confines the cover D down in place upon the marginal bearing *c*, but allows this cover to receive a lateral movement about the axis of said pivotal portion.

Other plans than those above described may be adopted for attaching a cover to a vessel, whereby the cover is allowed to receive an edgewise-lateral movement in uncovering or closing the opening in the top of the kettle, and I do not, therefore, desire to be understood as limiting my invention to the precise means of attachment herein shown and described, as it is obvious that other means equivalent thereto may be adopted which will admit of similar movements being given to the covers upon tea-kettles or other like vessels.

I prefer to arrange the pivotal attachment of the cover in the vertical plane of the front lug or bail, or handle-attachment B, and the spout A′, and have so illustrated it in the drawings.

It will be seen that, when this cover is wholly or partially off the opening in the top of the kettle, it will swing shut, upon simply inclining the vessel forward, as in the act of pouring liquid from the spout.

Said cover will also swing off in a rearward direction, and it can be swung off or over its opening, whether the bail or lifting-handle is either upright or lying down upon the right-hand side of the vessel.

Having described my invention,

What I claim as new, and desire to secure by Letters Patent, is—

In the manufacture of tea-kettles, such a construction and application of the lid or cover and its appurtenances, that the kettle, by means of an edgewise movement of the cover, shall be opened and closed at its top, substantially as described.

EZRA RIPLEY.

Witnesses:

R. T. CAMPBELL,

J. N. CAMPBELL.